United States Patent [19]
Liu

[11] 3,855,072
[45] Dec. 17, 1974

[54] MULTI-STAGE FLASH EVAPORATOR
[75] Inventor: Philip J. P. Liu, Waukesha, Wis.
[73] Assignee: Aqua-Chem, Inc., Milwaukee, Wis.
[22] Filed: July 28, 1972
[21] Appl. No.: 276,034

[52] U.S. Cl. .............................................. 202/173
[51] Int. Cl. ............................................. B01d 3/02
[58] Field of Search .......... 202/173, 174; 159/2 MS, 159/28 A; 203/10–11

[56] References Cited
UNITED STATES PATENTS

| | | | |
|---|---|---|---|
| 3,216,910 | 11/1965 | Langer et al. | 202/173 |
| 2,759,882 | 8/1956 | Worthen et al. | 203/11 |
| 2,908,618 | 10/1959 | Bethon | 203/11 X |
| 1,114,333 | 10/1914 | Bancel | 165/114 |
| 1,586,814 | 6/1926 | Leonard | 159/27 R |
| 1,638,697 | 8/1927 | Merlis | 159/27 X |
| 1,795,601 | 3/1931 | Hamill et al. | 159/27 X |
| 3,172,824 | 3/1965 | Mulford | 202/173 |
| 3,192,131 | 6/1965 | Loebel et al. | 159/2 MS X |
| 3,228,859 | 1/1966 | Frankel et al. | 202/173 |
| 3,595,757 | 7/1971 | Izumi | 202/173 |
| 3,713,989 | 1/1973 | Bom | 159/2 MS X |
| 3,707,442 | 12/1972 | Takahashi et al. | 202/173 X |

FOREIGN PATENTS OR APPLICATIONS

| | | | |
|---|---|---|---|
| 2,070,511 | 10/1971 | France | 202/173 |

Primary Examiner—Jack Sofer
Attorney, Agent, or Firm—Fred Wiviott

[57] ABSTRACT

A multi-stage flash evaporator having individual effects arranged with feed water preheater and vapor condensing heat exchange tubes which extend transversely to the direction of feed water flow between stages. The heat exchange tubes of the higher temperature stages are arranged in a generally rectangular array with two sides open to flashed vapors and a vent located at the apex of the other two sides. The heat exchange tubes of the lower temperature effects are arranged in a generally rectangular array with three sides open to the flashed vapors and a vent located at the midpoint of the closed side. The path between the open sides of the heat exchange tube bundles and their respective vents being unimpeded except by the heat exchange tubes.

16 Claims, 5 Drawing Figures

3,855,072

MULTI-STAGE FLASH EVAPORATOR

BACKGROUND OF THE INVENTION

This invention relates to flash evaporators and more particularly to the design of the individual stages of a multi-stage flash evaporator.

Multi-stage flash evaporators are widely employed for the purification of large quantities of impure water, such as sea water. In apparatus of this type, the liquid to be distilled, such as sea water, is sequentially passed through successive flash chambers held at successively lower pressures. The temperature of the liquid as it enters each stage exceeds the saturation temperature corresponding to the pressure of that stage causing a portion of the liquid to flash evaporate. The feed liquid is commonly preheated by being passed through heat exchangers associated with each stage which also serve to condense the flashed vapors. Prior to being fed into the flash chamber of the initial stage, the sea water is heated further, generally by an outside source. The condensed vapors are collected as the product water of the system.

As the need for fresh water grows, sea water distillation apparatus in general and flash evaporator plants in particular are being constructed in ever increasing sizes and capacities. This has been accomplished by increasing both the number and size of the individual flash evaporator stages. As such plants become larger, the configuration of the individual effects becomes critical with respect to effective operation for a given capital outlay.

SUMMARY OF THE INVENTION

It is a primary object of the invention to provide a new and improved flash evaporator structure.

Another object of the invention is to provide a relatively compact flash evaporator chamber structure for high capacity water distillation plants.

A further object of the invention is to provide a flash evaporator stage for a multi-stage system having feed water preheater and vapor condensing heat exchange means which efficiently accomplishes heat transfer and the removal of noncondensibles.

In general terms, the invention comprises a flash evaporator having at least one flash chamber divided into an evaporating space and a condensing space wherein heat exchange tube bundle means are disposed in the condensing space and extends in a direction generally transverse to the direction of feed water flow though the chamber. The heat exchange tube means is arranged such that a first margin thereof is exposed to the vapors flashed in the chamber and a vent is located in a second unexposed margin thereof and wherein the straight line of distance from any point on the exposed margin to the vent is substantially equal and the number of tubes to which the vapors are exposed constantly decreases as the vapors traverse the tube bundle from the exposed margin to the vent.

How the foregoing and other objects of the invention are accomplished will become apparent from the detailed description of the preferred embodiment taken with the accompanying drawings.

DESCRIPTION OF THE PREFERRED EMBODIMENT

Figure 1:
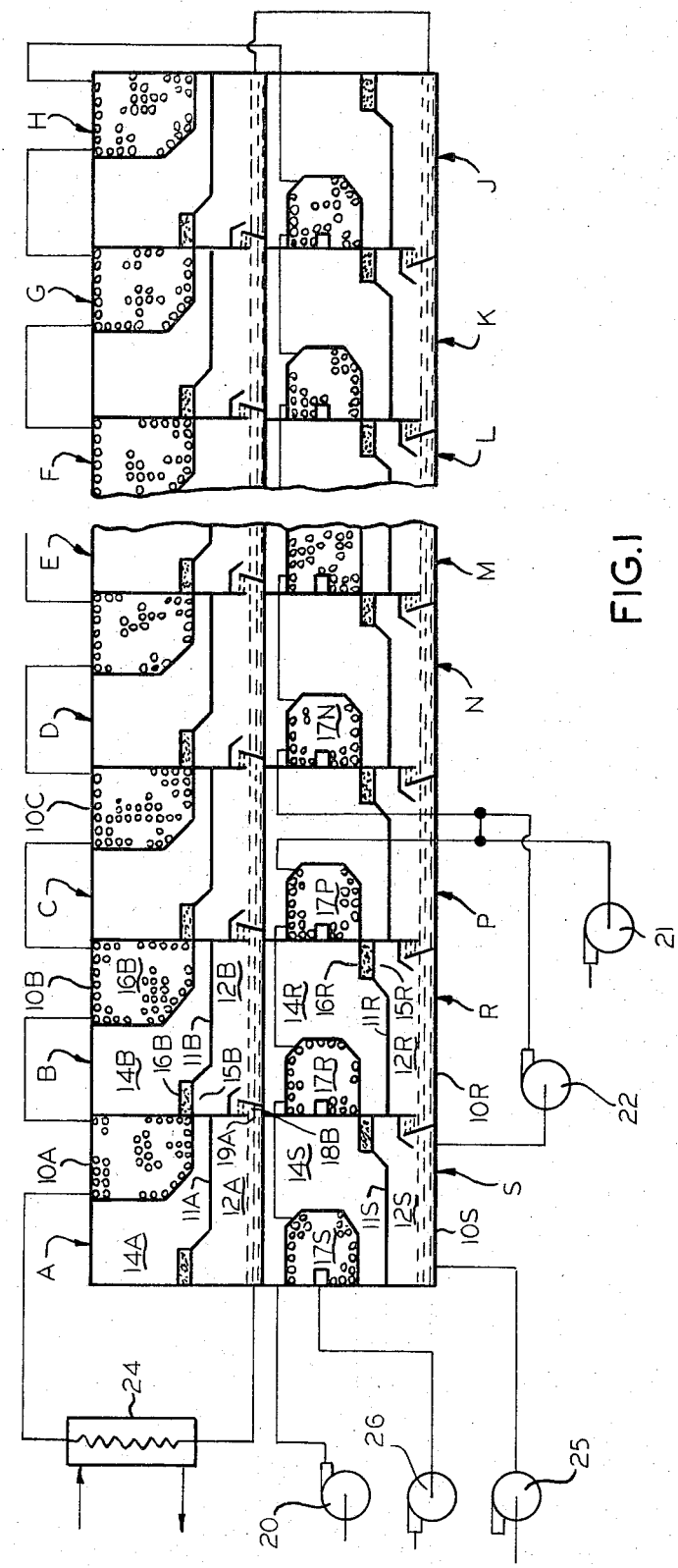
FIG. 1 schematically illustrates a multi-stage flash evaporator incorporating the present invention.

Referring to FIG. 1, a flash evaporator is schematically illustrated to include a plurality of stages identified by the letters A–S, although it will be appreciated that any number of stages may be employed. Stage B is typical of stages B to H and stage R is typical of stages J to S and, accordingly, only stages B and R will be discussed in detail for the sake of brevity. Corresponding parts of the various stages will be given the same reference numeral and when these parts are referred to with respect to specific stages, the reference numeral will be followed by the appropriate identifying letter.

Each of the stages includes an outer housing 10 which is separated by a partition 11 into a flash evaporating space 12 and a condensing space 14. The partition 11 has a gap 15 along one side for connecting the evaporating space 12 to the condensing space 14. An entrainment separator 23 is preferably disposed in the gap 15. Disposed within condensing space 14 of each of effects A to H is a first heat exchange tube bundle configuration 16 and disposed within condensing space 14 of each of the stages J to S is a second heat exchange tube bundle configuration 17.

The seawater to be purified is conducted to the system by means of a seawater pump 20 which is coupled to the heat exchange tube bundle 17S of the lowest pressure stage and the seawater then successively passes to the heat exchange tube bundles 17R and 17P respectively of stages R and P which along with stage S comprise the heat reject section of the system. After exiting the heat exchange tube bundles 17P of effect P, a first portion of the cooling seawater is discharged to waste by pump 21 and a second portion is mixed with a portion of the brine withdrawn from the lowest temperature stage. This mixture is then pumped by recirculation pump 22 to the heat exchange tube bundle 17N of stage N from which it is circulated sequentially through the heat exchange tube bundles 17N to 17J of stages N to J and heat exchange tube bundles 16H to 16A of stages H to A. The feed water is heated in each of the heat exchange tube bundles 16 and 17 and is then heated further in a heat exchanger 24 to a temperature in excess of the saturation temperature corresponding to the pressure in the evaporating space 12A. Upon being fed into flash evaporation space, a portion of the feed water flash evaporates and passes upwardly around partition 11A into the condensing space 14A for condensing on the feed water preheater tube bundle 16A. Each stage includes an entrance port 18 and an exit port 19 with the entrance port of each stage being coupled to the exit port of the preceding stage. In this manner, the unevaporated feed water in stage A flows successively through stages B to S where it enters each stage at a temperature higher than the saturation temperature for such stage so that a portion flash evaporates and is condensed on its respective heat exchange tube bundles 16 or 17. The distillate in each stage collects on divider 11 and is withdrawn as the product water of the system in a manner which is not shown but which is well known in the art. A first portion of the brine in the last stage S is recirculated by pump 22 and a second portion is discharged by blowdown pump 25. As will be explained in greater detail below, the stages are interconnected by a series of vents with the last stage coupled to a suitable vacuum system symbolized by pump 26 so that each succeeding stage will be at a lower pressure. Those skilled in the art will appreciate that before fresh seawater is circulated through the system, it may be suitably deaerated, degassed and treated with a scale preventing chemical.

Figure 3:
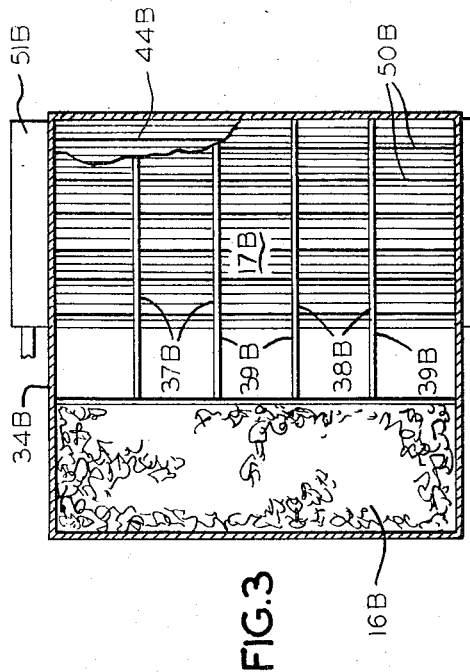
FIG. 3 is a top plan view, with parts broken away, of the flash evaporator stage illustrated in FIG. 2.
Figure 2:
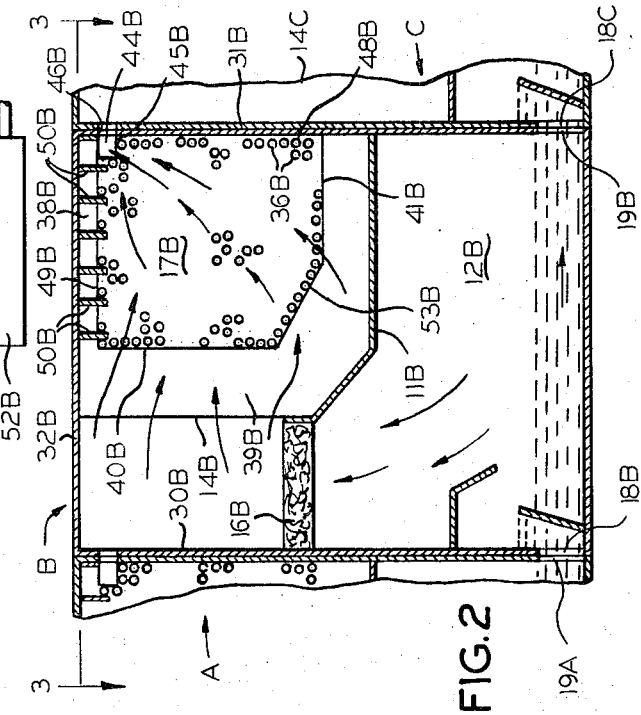
FIG. 2 is a side elevational view, with parts broken away, showing the configuration of at least some of the stages of the evaporator illustrated in FIG. 1.

Referring now to FIGS. 2 and 3, stage B is shown in greater detail to include an outer generally rectangular shell 10B having front, rear, top, bottom and side walls 30, 31, 32, 33 and 34, respectively. Stage B also includes a heat exchange tube bundle 16B which is typical of stages A to H and includes a plurality of heat exchange tubes 36 supported by a plurality of apertured tube support plates 37 which are suitably mounted in housing 10B and which also support the divider 11. The tube bundle 16B is arranged in a generally rectangular array in horizontal cross section with a first substantially vertical side margin 40 and a second substantially bottom margin 41 both exposed to the flashed vapors symbolized by arrows 42. A vent space 44 which is empty of heat exchange tubes 36 and which includes windows 45 cut in tube supports 37, extends the entire length of heat exchange tube bundle 16B and is coupled to an opening 46 and rear wall 31 leading to the lower pressure condensing space 14C of the next stage C. The second vertical margin 48 of the heat exchange tube bundle 16B abuts the rear wall 31 of shell 10B to prevent the flow of vapors 42 therearound to the vent space 44. The top margin 49 of heat exchange tube bundle 16B is spaced from the top wall 32 of shell 10 by the upper ends of the tube sheets 37. To prevent the vapors 42 from short circuiting the heat exchange tubes 36 and flowing along surface 49 to the vent 44, a series of plates 50 are affixed to the upper wall 32 and extend vertically downwardly to a point below the margin 49. A first water box 51 is disposed at one end of heat exchange tube bundle 16B for receiving feed water from stage A and a second water box 52 is disposed at the other end thereof for passing the same to stage C. It will be appreciated that the ends of the tubes 36 are sealingly affixed in a suitably apertured tube sheet (not shown) and which are supported at the inner end of each water box 51.

It is desirable to arrange the tubes 36 such that the distance from any point on the exposed marginal area is substantially equidistant to the vent space 44. This could be achieved, for example, by arranging the heat exchange tubes such that the exposed marginal area of the bundle 16B forms an arc whose center of radius is the vent space 44. Such an arcuate configuration, however, would not efficiently utilize available space or be convenient for fabrication purposes. An outer marginal configuration which approximates an arc is provided by arranging the tubes 36 with a third exposed margin 53 of bundle 16B provided between marginal planes 40 and 41. In this manner, a total exposed marginal area is provided wherein the distances from the vent space 44 to any point on such exposed marginal areas are substantially equal. As a result, the vapors 42 enter heat exchange tube bundle 16 over substantially the entire exposed marginal area and are drawn through tube bundle 16 to vent space 44 under the influence of the lower pressure existing in condensing chamber 14C to which vent space 44 is connected. These vapors sweep through the tube bundle 16 at a substantially uniform velocity from all exposed areas to effectively remove noncondensibles which normally tend to become trapped between the tubes and thereby adversely affect heat transfer properties.

It will be appreciated that as the vapors 42 pass through bundle 16, portions thereof will continuously be condensed. In order to maintain the vapor velocity substantially constant as it traverses bundle 16 thereby to sweep noncondensibles into vent space 44, the bundle is arranged such that as the vapor converges on vent space 44, it will be moving into progressively decreasing volumetric space. By providing a relatively large outer margin of tube bundle 16B which is exposed to the vapors 42 and flow paths of substantially equal length, the pressure gradient across the tube bundle 16 is substantially uniform regardless of the point on the marginal surface at which the vapor enters for passage to the vent 44. This configuration also contributes to the maintenance of a low temperature drop in the vapor as it traverses the heat exchange tube bundle 16 to maintain the temperature difference between the vapor 42 and the cooling sea water flowing in tubes 36 at a relatively high level without a sacrifice in structural economy.

Figure 5:
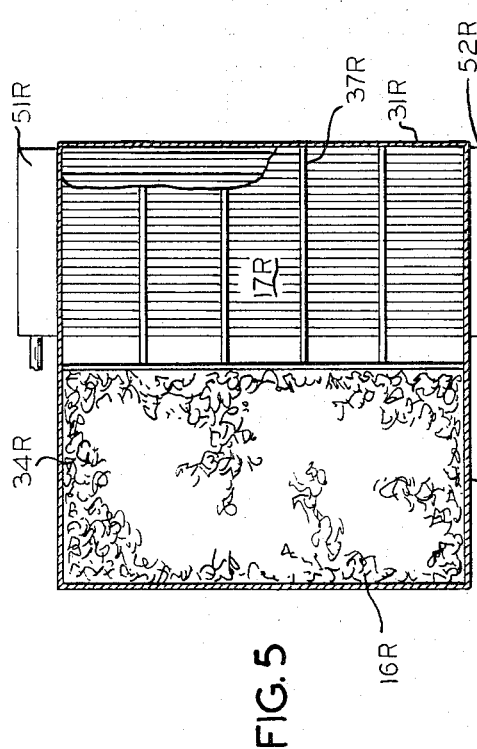
FIG. 5 is a top plan view, with parts broken away, of the flash evaporator stage illustrated in FIG. 4.
Figure 4:
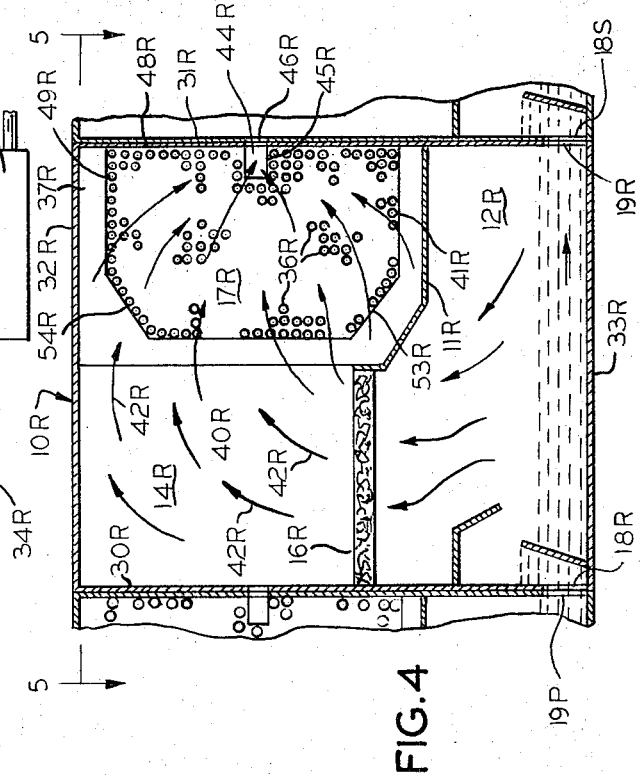
FIG. 4 is a side elevational view, with parts broken away, of the configuration of another of the stages of the flash evaporator illustrated in FIG. 1.

Referring now to FIGS. 4 and 5, stage R is shown to be configured substantially similarly to stage B except for the configuration of the heat exchange tube bundle 17R. Here the top and bottom marginal areas 41R and 49R and the vertical marginal area 40R are all exposed to the vapors 42. The vent space 44R is intermediate the ends of the margin 48R of bundle 17R and which side abuts front wall 31R. It will be appreciated that as in the case of effects A to H the vent space 44R is free of tubes 36 and includes windows 45R cut in the tube supports 37. As a result, the vapors 42 are prevented from short circuiting the tubes 36 as they flow to the vent space 44R. Here again, it is desirable that the distance from all points on the exposed area of the heat exchange tube bundle to the vent space 44R be substantially uniform. This suggests a substantially circular section, which would be inconvenient to construct and wasteful of space. Accordingly, the circular outer margin is approached by providing a marginal area 53R between marginal areas 40R and 41R and a second marginal area 54R between marginal areas 40R and 49R. As in the case of effect B, the vapors enter the heat exchange tube bundle over the entire outer exposed marginal area and sweep through the bundle 17R at a substantially uniform velocity to effectively remove noncondensibles. In addition, as the vapor 42 passes through the bundle 16 and a portion condenses, the vapors move into a progressively decreasing volume so that their velocity remains substantially constant.

The volume of vapor generated in the lower pressure stages is greater than that in the higher stages. Thus, in the higher stages, it is desirable to maintain the velocity of vapor flow to effect efficient sweeping action by limiting the exposed marginal area. This is accomplished by arranging the heat exchange tube bundle 17R such that there is a greater exposed marginal area than heat exchange tube bundle 16B.

While the embodiment of the invention shown in FIGS. 2 and 4 each stage includes a front wall 30 and a rear wall 31, a common partition may be employed between effects with a single aperture serving as both the stage entrance and exit.

From the foregoing it will be appreciated that the flash evaporator structure according to the preferred embodiment of the invention is effective to provide substantially uniform vapor flow through the heat exchange tube bundles 16 or 17 to effectively sweep noncondensibles into the vent spaces 44 without substantial vapor temperature loss.

While only a single embodiment of the invention has been shown and described, it is not intended to be limited thereby but only by the scope of the appended claims.

I claim:

1. A flash evaporator having means defining an enclosure,
   first means dividing said enclosure into an evaporating space adjacent a lower end thereof and a condensing space adjacent an upper end thereof, said first means having a passageway therein interconnecting said spaces,
   spaced apart entrance and exit openings formed in said enclosure defining means and each opening into said evaporating space for respectively receiving and discharging feed liquid with respect thereto,
   said evaporator being constructed and arranged to vaporize at least a portion of the feed liquid in said evaporating space and for passage of the resulting vapor upwardly through said passageway into said condensing space,
   a vent port formed in said enclosure defining means and opening into said condensing space,
   heat exchange tube bundle means disposed in said condensing space and between said passageway and said vent port, said heat exchange tube bundle means comprising a plurality of generally parallel unbaffled heat exchange tubes arranged generally horizontally and transversely to the flow of vapor through said condensing space and toward said vent port,
   a first substantially vertical plurality of said heat exchange tubes defining a first marginal side of said heat exchange tube bundle and being disposed contiguously adjacent said enclosure defining means, a substantially vertical wall of said vent port opening into said first marginal side, a second plurality of said heat exchange tubes defining a second marginal side of said heat exchange tube bundle displaced from said vent port and being exposed to the vapors emanating from said evaporating space and passing into said condensing space through said passageway and a third marginal side of said heat exchange bundle spaced below and generally parallel to the upper wall of said enclosure to define therewith a third space,
   means within said third space for preventing the flow of vapor to said vent port, said second plurality of tubes being substantially equidistant from said vent port.

2. The evaporator set forth in claim 1 and wherein said divider means is disposed below said heat exchange tubes and is constructed and arranged to collect condensate therefrom.

3. The evaporator set forth in claim 1 wherein entrainment separator means is disposed in said passageway between said evaporating space and said condensing space.

4. The evaporator set forth in claim 1 wherein said heat exchange tube bundle means is generally polygonal in transverse vertical cross section,
   said second plurality of heat exchange tubes defining at least two sides of said polygon lying in intersecting planes and being exposed to the vapor from said passageway,
   said vent port means being approximately equidistant from all tubes lying on said exposed sides.

5. The evaporator set forth in claim 4 and wherein said divider means is disposed below said heat exchange tubes and is constructed and arranged to collect condensate therefrom.

6. The evaporator set forth in claim 5 wherein entrainment separator means is disposed in said passageway between said evaporating space and said condensing space.

7. The evaporator set forth in claim 4 wherein the height and width of said heat exchange tube bundle means in the direction of vapor flow are substantially equal, said second marginal side means defining a fourth generally horizontal bottom side and a fifth generally vertical side, said vent means being disposed at the intersection of said first and third marginal sides.

8. The evaporator set forth in claim 7 wherein said second marginal side of said heat exchange tube bundle means further comprises a sixth side which intersects said fourth horizontal side and said fifth side at an obtuse angle.

9. A flash evaporator having means defining an enclosure,
   first means dividing said enclosure into an evaporating space adjacent a lower end thereof and a condensing space adjacent an upper end thereof, said first means having a passageway therein interconnecting said spaces,
   spaced apart entrance and exit openings formed in said enclosure defining means and each opening into said evaporating space for respectively receiving and discharging feed liquid with respect thereto,
   said evaporator being constructed and arranged to vaporize at least a portion of the feed liquid in said evaporating space and for passage of the resulting vapor upwardly through said passageway into said condensing space,
   a vent port formed in said enclosure defining means and opening into said condensing space,
   heat exchange tube bundle means disposed in said condensing space and between said passageway and said vent port, said heat exchange tube bundle means comprising a plurality of generally parallel unbaffled heat exchange tubes arranged generally horizontally and transversely to the direction of vapor flow through said condensing space and toward said vent port,
   a first plurality of said heat exchange tubes defining a first marginal side of said heat exchange tube bundle and being disposed contiguously adjacent said enclosure defining means to prevent vapor reaching said vent port by flowing around exposed marginal sides of the tube bundle means direct to said vent port, said vent port opening into said first marginal side, a second plurality of said heat exchange tubes defining second, third and fourth marginal sides of said heat exchange tube bundle and being displaced from said vent port and being exposed to the vapors emanating from said evaporating space and passing into said condensing space through said passageway, said first and second marginal sides being arranged generally vertically and said third and fourth marginal sides being arranged generally horizontally and defining the upper and lower margins of said heat exchange tube bundle means, said vent port being disposed substantially intermediate the ends of said first marginal area, said second plurality of tubes each being substantially equidistant from said vent port.

10. The evaporator set forth in claim 9 wherein said second plurality of tubes of said heat exchange tube bundle means further define a fifth side which intersects said second and fourth sides and a sixth side which intersects said second and third sides at an obtuse angle.

11. The evaporator set forth in claim 10 wherein said enclosure defining means includes a pair of generally vertical partition walls to define the ends of said enclosure, said entrance opening being formed adjacent the lower end of one of said partition walls and said exit opening being formed adjacent said other partition wall, said heat exchange tube bundle means being mounted adjacent the upper portion of one of said partition walls.

12. A multi-stage flash evaporator having means defining a plurality of enclosures arranged in a contiguous series relation, means dividing each of said enclosures into an evaporating space and a condensing space and having a passageway formed therein interconnecting said spaces, each of said enclosures including means defining a feed liquid entrance and a feed liquid exit in its respective evaporating space, the feed liquid entrance of each effect being connected to the feed liquid exit of the previous effect in said series to provide for the series flow of feed liquid through said enclosures, heat exchange tube bundle means disposed in the condensing space of each of said enclosures and comprising a plurality of unbaffled generally horizontal heat exchange tubes extending in a direction generally transverse to the direction of feed liquid flow between the entrance and exit of each enclosure, a vent port formed in each of said enclosures for connecting the condensing space of one enclosure to the condensing space of the next enclosure in said series, the margins of each of said heat exchange tube bundle means being generally defined by top and bottom generally horizontal marginal sides and a pair of generally vertical marginal sides, the height and width in the direction of vapor flow of a first plurality of heat exchange tube bundle means being substantially equal, one of said first plurality of heat exchange tube bundle means being disposed in each of a first group of enclosures in said series with a first one of its vertical marginal sides disposed contiguously adjacent its associated enclosure defining means which contains said vent port, means associated with each of said first plurality of heat exchange tube bundle means for preventing the flow of vapor along said top side, the other of said vertical marginal sides and said bottom marginal side of each of said first plurality of heat exchange means being open to their associated condensing space, said vent port means in each of said first group of enclosures being disposed at the intersection of the top and said first vertical side of the heat exchange tube bundle disposed therein, the height of a second plurality of said heat exchange tube bundle means being greater than the width thereof, one of said second plurality of heat exchange tube bundle means being disposed in each of a second group of said enclosures in said series with a first one of said vertical marginal sides being disposed contiguously adjacent that portion of its associated enclosure defining means common to it's downstream neighboring enclosure defining means, the other of said vertical marginal sides and the top and bottom marginal sides of said second plurality of heat exchange tube bundle means being open to their respective condensing space, said vent port being formed in each of the second group of enclosures at approximately the midpoint of the one vertical marginal side of the heat exchange tube bundle means in said enclosures.

13. The evaporator set forth in claim 12 wherein the number of heat exchange tubes lying within any given straight line distance from the vent port of each enclosure increases as said distance increases.

14. The evaporator as claimed in claim 13 including means for evacuating each of said enclosures to establish successively lower pressures therein from a first one of said enclosures to a last one of said enclosures.

15. The evaporator as claimed in claim 14 wherein said first group of enclosures is located at the relatively higher pressure end of said series of enclosures and said second group of enclosures is located at the relatively lower pressure end of said series of enclosures.

16. The evaporator as claimed in claim 15 wherein each of said first plurality of heat exchange tube bundle means is further defined by a fifth marginal side intersecting said one vertical marginal side and said bottom marginal side at an obtuse angle and wherein each of said second plurality of heat exchange tube bundle means is further defined by a fifth marginal side which intersects said one vertical marginal side and said bottom marginal side at an obtuse angle and a sixth marginal side which intersects said one vertical marginal side and said top marginal side at an obtuse angle.

* * * * *